Nov. 23, 1937.   F. M. COWAN   2,100,184
BREATHER FOR TEMPERATURE RISE ALARM SYSTEMS
Filed May 24, 1933
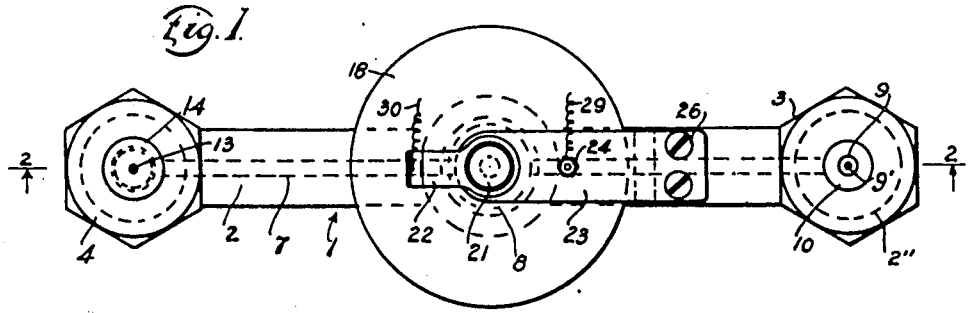
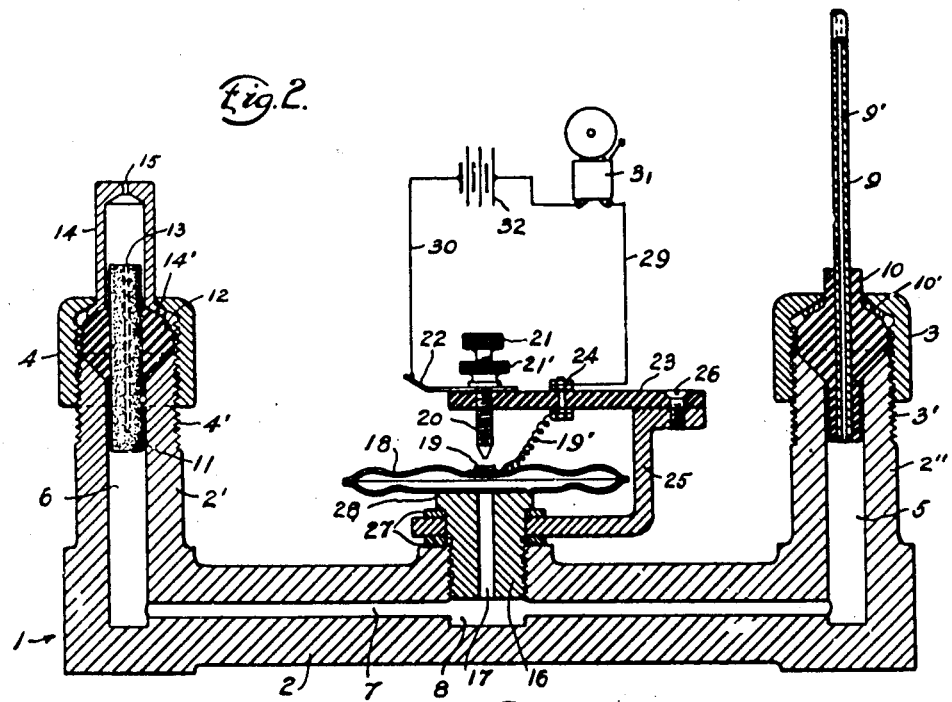
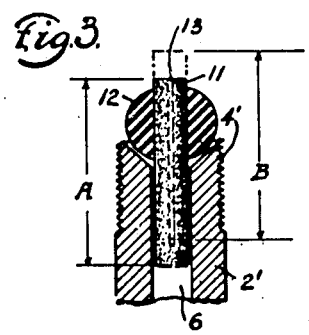
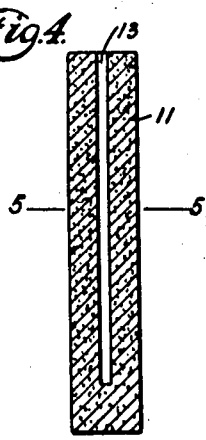
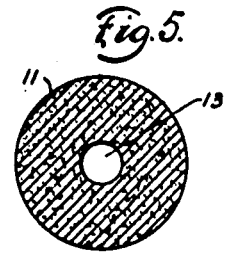
INVENTOR-
Frank M. Cowan;
BY
Harold J. Penney, ATTORNEY- Patented Nov. 23, 1937

2,100,184

UNITED STATES PATENT OFFICE 2,100,184

BREATHER FOR TEMPERATURE RISE ALARM SYSTEMS

Frank M. Cowan, Plainfield, N. J., assignor to American District Telegraph Company, New York, N. Y., a corporation of New Jersey Application May 24, 1933, Serial No. 672,537

8 Claims. (Cl. 177—355)

The present invention relates to an improvement in vent means for air-tube fire alarm systems in which alarms or signals are actuated by a heat sensitive, expansive fluid in a tube, in which the alarm system will not function until a sudden, predetermined rate of rise in temperature is reached.

One object of the invention is to provide an improved compensating vent means for such a tube system, which is adjustable to varying conditions of local installations and surroundings, to compensate pressures produced within the tube system by normal temperature changes in the protected area, and to prevent the operation of the system until the rate of temperature rise exceeds a predetermined amount.

Still other objects of the invention will appear as the description proceeds; and while the details of the herein invention are described and claimed, many and various changes may be made without departing from the scope of the invention as claimed in the broader claims.

The present improvement is shown in connection with a detector alarm system.

In the drawing,

Fig. 1 is a plan view of a detector system utilized in conjunction with my improvement;

Fig. 2 is a sectional elevation thereof taken on the line 2—2, Fig. 1, looking in the direction of the arrows, with a diagrammatic illustration of part of an alarm system;

Fig. 3 is a fragmentary sectional view of the vent member and its sealing means with the compression locking means removed;

Fig. 4 is an enlarged sectional view, in elevation of the improved vent element; and Fig. 5 is an enlarged transverse sectional view, taken on the line 5—5, Fig. 4.

In Fig. 2 there is shown for informative purposes, an alarm actuating means for an air-tube protective system, in which a portion of an air tube 9, having a bore 5' therein, is entered at its terminal end into a seal generally denoted by 10 and having an intermediate bulbous portion. The bulbous portion of the seal which is made of high grade soft rubber, rests in a tapered seat in the upper end 3' of a threaded nipple 2", the lower open end of the tube 9 communicating with the bore 5 of said nipple. The nipple 2" is integral with a bored cross or base piece 2, the duct 7 of which communicates with bore 5. The upper portion of the rubber seal 10 seats a coned metal washer 10', and this washer is in turn pressed upon by a threaded sealing cap 3, whereby the bulb-seal 10 is compressed, so that its deformation causes the seal to be compressed and tightened in the nipple seat and against the air tube 9, thus sealing and gripping the tube firmly in operative position.

At the opposite end of the bored cross piece 2 is integrally connected a second upright 2', the duct 6 of which communicates with duct 7, the upper end of said upright 2' being threaded, as at 4', to receive thereon a threaded nipple 4. The upper end of duct 2' is tapered inwardly to form a seat upon which is mounted a rubber sealing plug 12.

In the center of the sealing plug 12, is mounted a vent plug 11, shown enlarged, in section, in Figs. 4 and 5.

A protecting breather cap 14, having an inner bore of larger diameter than the vent plug 11, is provided with a breather vent hole 15, and at its lower end is provided with a flared pressure flange 14'. The function of this cap 14 is to permit air from the duct system 5—6—7 to expand to atmosphere, while sufficiently protecting the vent plug 11 from dust and the like, so as to maintain said vent plug at high efficiency.

When this latter described assembly is in the position noted in Fig. 1, the threaded nipple compresses the rubber seal 12 into its seats and the deformation thereof causes it to firmly surround and grip the vent plug in a tight operative position. The function of the flared flange 14' is the same as for the coned washer 10', that is to act to hold the upper end of the enlarged portion of the rubber grip seal 12, in firm grip against the tapered seat, and to prevent twisting the rubber seal when affixing or removing the threaded caps 3—4.

At the center of the cross or base piece 2, Fig. 1, there is located a threaded boss into which is mounted a bored, threaded plug 16, the upper end of which has a head 28, between which and the top of the boss, with washers 27, is clamped a bored bracket arm 25. The upper end of arm 25 supports, by screws 26, an insulating arm 23, on the outer end of which is threadedly mounted an adjustable, headed contact screw 20. After the screw 20 has been adjusted by its head 21, the lock nut 21' is turned to hold the screw in adjusted position, and, simultaneously, holds an outstanding soldering connector 22 in position to be connected to a line 30 with its current source 32.

At the top of the plug 16, upon its head 28 is fixedly mounted a single bellows diaphragm 18, the interior of which opens into the bore 17 of plug 16, and thus the interior of the diaphragm is in connection with the duct system 5—6, 7, 8', and 17, and is therefore affected when the air pressure in said system is affected by temperature rises of a predetermined abnormal rate in duct system 6'. The upper face of the diaphragm carries a central contact 19, which in turn is connected to a connector 24 in arm 23, by a flexible connector 19'. The connector 24 is connected by a wire 29, to one terminal of an electric alarm signal 31, the other terminal of signal 31 being connected to current source 32.

As thus described, and shown in Fig. 1 the alarm circuit is open. Sudden temperature changes, upwardly, cause the air to expand in the duct system, cause the diaphragm to expand, the contact 19 touches contact screw 20, and closes the alarm circuit, and causes signal 31 to indicate the pressure change within the duct system. Slow rises and drops in temperatures are permitted in the usual manner, without signalling.

As previous stated, conditions surrounding each installation of this alarm system may be unlike, and with a standard, uniformly acting vent means at the breather end 4 of this system, some means must be provided whereby a standardized system venting means 11, may be so varied in its operative function that the variable slow rate of rise of pressures in different installations may be met, to obtain accurate and efficient action.

To this end a venting plug 11 is provided, wherein by manual adjustment only, in its operative position, before closing it over with the protection cap 14, the vent plug may be set to control the emission of air from the duct system at the desired rate of flow.

As will be noted in Figs. 1, 3, 4, and 5, the vent plug is cylindrical and is provided with an internal bore, which is blind, i. e., is open only at one end preferably its upper end. The plug 11 itself is made of a suitable material of porous nature, the internal physical pores of which are sufficiently open and interconnected as to permit air to pass therethrough in either direction, and thus control the slow rate of air flow into or out of the duct system.

Many porous materials may be advantageously utilized for this purpose, and some of these are brick, unglazed vitrifiable material, carbon, unbaked porcelain and carborundum.

Of these, carbon has been found to have many advantages in that it is of low cost, stable, uniform in porosity, easy to manufacture and machine and extremely lasting, without loss of efficiency over long periods of time, in installation.

In action, the air passes through the porous walls and bottom into the interior bore 13 and from thence to atmosphere through vent 15 in cap 14, when a temperature rise expands the air in the duct system. When the temperature drops the air movement through the plug is reversed.

In operative position, as shown in Fig. 2, it will be noted that the lower end of the vent plug 11, extends below the rubber seal 14', a certain distance, which distance is disclosed as dimension B, Fig. 3. When in this position, a certain external area of the plug is presented to the surrounding air space within duct 6, thus permitting a certain flow of air therethrough in direct proportion to the surface area exposed to such air.

To increase the capacity of air flow through the vent plug, and thus alter the rate of rise of pressure within the duct system over that of the plug setting of B, the cap 4 is loosened and removed with cap 14, the seal with the plug 11 therein is removed and the plug 11 set down lower. The seal and plug are then restored to operative position. This new set or adjusted position of the plug will then approximate the setting A of Fig. 3, and more of the external surface area will be presented to the surrounding air in duct 6, such increase being proportional to the length of the vertical dotted lines shown at the top of the plug in Fig. 3.

To decrease the rate of flow from the duct system, the vent plug 11 may be raised upwardly in its rubber sealing plug 12, and thus decrease the amount of external area presented to the surrounding air space in duct 6.

The breather shown may be made from commercial carbon rod having such porosity that a suitable outside diameter in connection with a bore of the proper length and diameter will allow a flow of air of the order of that permitted by breathers of the prior art.

What I claim is:

1. An air tube fire detector system comprising a detector, tubing, a rigid breather of dense porous mineral material, means for securing the breather to said system so that air may be interchanged between the inside and outside of the tubing through the breather.

2. An air tube fire detector system comprising a detector, tubing, a porous carbon breather, means for securing the breather to said system so that air may be interchanged between the inside and outside of the tubing through the breather.

3. An air tube fire detector system comprising a detector, tubing, a rigid breather of dense porous material means for securing the breather to said system so that air may be interchanged between the inside and outside of the tubing through the breather, said system also including means for adjusting the capacity of the breather for the interchange of air.

4. An air tube fire detector system comprising a detector, tubing, a porous carbon breather, means for securing the breather to said system so that air may be interchanged between the inside and outside of the tubing through the breather, said system also including means for adjusting the capacity of the breather for the interchange of air.

5. An air tube fire detector system comprising a detector tubing, a member provided with a duct extending therethrough, means for tightly connecting the tubing to one end of said duct, a porous carbon breather, means for removably securing said breather to the other end of said member in air tight relation to said duct to permit the interchange of air between the duct and the atmosphere, said means also including means for varying the exposed surface of the breather to vary the capacity of the breather for the interchange of air.

6. In an air-tube fire-detector, means forming a duct, a heat-conductive detector-tube and a pressure-sensitive protective means communicating with said duct; said tube being adapted to be disposed over locations to be protected and having air therein arapted to be expanded by dangerous heat to operate said protective means and a rigid breather of non-hygroscopic rigid dense porous material mounted air-tight in said duct and adapted for the passage of dry and highly moist air through the breather in opposite directions during warm and cold weather.

7. In an air-tube fire-detector, means forming a duct; a heat-conductive detector tube and a pressure-sensitive protective means communicating with said duct; and a rigid breather of non-hygroscopic rigid dense porous granular material mounted air-tight in said duct and adapted for the passage of dry or highly moist air through the breather in opposite directions during warm or cold weather; said tube being disposed over locations to be protected and having air therein adapted to be expanded by dangerous heat at said location, thereby to operate said protective means; said breather being adapted during warm and cold weather to exhale highly moist air fast enough to prevent operation of the protective means by harmless rise of temperature at such locations and to inhale fast enough during falling temperature to prevent harmful delay in protective-means operation by dangerous heat at any of said locations.

8. In combination, a threaded member having a longitudinal duct flared to form an outer end seat; a compressible rubber seal member resting in said seat and having a bore; an elongated cylindrical porous vent plug in said bore and duct and smaller in diameter than the duct having an end projecting from the seal member, said vent plug having a longitudinal bore therein closed at the projecting end and open at the other; a perforated cap over said vent plug and having a flange resting on the threads of said seal; and a threaded nipple screwed on said member and having a flange engaged over said flange of the cap for pressing said seal member against the plug and seat.

FRANK M. COWAN.